US011738223B2

(12) United States Patent
Sadek et al.

(10) Patent No.: US 11,738,223 B2
(45) Date of Patent: Aug. 29, 2023

(54) FIRE SUPPRESSION SYSTEM

(71) Applicant: Marioff Corporation Oy, Vantaa (FI)

(72) Inventors: Mikolaj Jakub Sadek, Gdańsk (PL); Nazar Krutskevych, Gdańsk (PL); Wojciech Dominik Zimny, Gdańsk (PL)

(73) Assignee: MARIOFF CORPORATION OY, Vantaa (FI)

( * ) Notice: Subject to any disclaimer, the term of this patent is extended or adjusted under 35 U.S.C. 154(b) by 197 days.

(21) Appl. No.: 17/025,412

(22) Filed: Sep. 18, 2020

(65) Prior Publication Data

US 2021/0086010 A1 Mar. 25, 2021

(30) Foreign Application Priority Data

Sep. 20, 2019 (EP) ..................... 19198720

(51) Int. Cl.
  *G01L 9/00* (2006.01)
  *A62C 37/50* (2006.01)
  (Continued)

(52) U.S. Cl.
  CPC .............. *A62C 37/44* (2013.01); *A62C 37/48* (2013.01); *A62C 37/50* (2013.01); *G01L 9/0095* (2013.01); *A62C 37/14* (2013.01)

(58) Field of Classification Search
  CPC ......... A62C 31/02; A62C 37/14; A62C 37/44; A62C 37/48; A62C 37/50; G01L 9/0095
  See application file for complete search history.

(56) References Cited

U.S. PATENT DOCUMENTS

| 4,831,870 A | 5/1989 | Smith |
| 5,971,080 A | 10/1999 | Loh et al. |
| (Continued) | | |

FOREIGN PATENT DOCUMENTS

| CN | 202751724 U | 2/2013 |
| CN | 104606827 A | 5/2015 |
| (Continued) | | |

OTHER PUBLICATIONS

Hernandez-Sebastian et al.; "Design and Simulation of an Integrated Wireless Capacitive Sensors Array for Measuring Ventricular Pressure", Sensors; MDPI; 2018; 19 Pages.
(Continued)

*Primary Examiner* — Darren W Gorman
(74) *Attorney, Agent, or Firm* — Cantor Colburn LLP

(57) ABSTRACT

There is provided a sprinkler device, comprising: a sprinkler bulb 100 comprising a sealed frangible housing 110, and a passive circuit device 120 within the housing 110, wherein the passive circuit device 120 comprises a wireless module 160; and a base station 200 configured to detect pressure changes inside the sprinkler bulb 110 via the wireless module 160. A method of testing integrity of a sprinkler bulb is also provided, comprising: monitoring a pressure change within the sprinkler bulb 100 via a wireless module 160 of a passive circuit device 120 inside a sealed frangible housing 110 of the sprinkler bulb 100; and determining that the sprinkler bulb is in working order if the pressure reaches a predetermined threshold; or determining that the sprinkler bulb is not in working order if the pressure does not reach the predetermined threshold.

12 Claims, 5 Drawing Sheets

(51) Int. Cl.
*A62C 37/14* (2006.01)
*A62C 37/44* (2006.01)
*A62C 37/48* (2006.01)

(56) References Cited

U.S. PATENT DOCUMENTS

| | | | |
|---|---|---|---|
| 6,505,516 | B1 | 1/2003 | Frick et al. |
| 7,559,250 | B2 | 7/2009 | Seitz et al. |
| 7,633,393 | B2 | 12/2009 | Bonne |
| 8,395,496 | B2 | 3/2013 | Joshi et al. |
| 8,573,315 | B1 | 11/2013 | Taylor |
| 9,095,736 | B2 | 8/2015 | Kochelek et al. |
| 10,197,230 | B2 | 2/2019 | Knapp et al. |
| 10,232,206 | B2 | 3/2019 | Nelson et al. |
| 2004/0194976 | A1 | 10/2004 | Kretzschmar |
| 2017/0304664 | A1* | 10/2017 | Tanklevski ............. A62C 37/14 |
| 2017/0328799 | A1 | 11/2017 | Stilwell et al. |
| 2018/0200552 | A1* | 7/2018 | Wertsberger ........... A62C 37/40 |
| 2018/0361183 | A1* | 12/2018 | Tanklevski ............. A62C 37/50 |
| 2019/0344110 | A1* | 11/2019 | Tanklevski ............. A62C 37/50 |

FOREIGN PATENT DOCUMENTS

| | | | |
|---|---|---|---|
| CN | 103203087 B | 9/2015 | |
| CN | 105092586 A | 11/2015 | |
| CN | 106568478 A | 4/2017 | |
| DE | 102004021681 B3 * | 11/2005 | ............. A62C 37/50 |
| EP | 2994203 A1 | 3/2016 | |
| EP | 3597274 A1 | 1/2020 | |

OTHER PUBLICATIONS

Kumar et al.; "Crack Detection in Pipelines Using Capacitive Sensors"; IJESRT; Department of Electronics and Communication Engineering; Apr. 2013; pp. 820-827.

Roach et al.; "Real Time Crack Detection Using Mountable Comparative Vacuum Monitoring Sensors" Smart Structures and Systems, vol. 5; No. 4; 2009; pp. 317-328.

Zheng et al.; "Design and Manufacturing of a Passive Pressure Sensor Based on LC Resonance"; Micromachines; MDPI; 2016; vol. 7; No. 87; 7 Pages.

Zhuiykov et al.; "Maintenance Testing of Sprinkler Heads: Qualitative Analysis Causes of Failures"; Materials Scientist; CSIRO, International Association for Fire Safety Science; 2005; pp. 811-822.

European Search Report for Application No. 19198720.5; dated Mar. 19, 2020; 6 Pages.

Chinese Office Action for Application No. 202010988966.6; dated Dec. 1, 2022; 8 Pages.

* cited by examiner

FIRE SUPPRESSION SYSTEM

FOREIGN PRIORITY

This application claims priority to European Patent Application No. 19198720.5, filed Sep. 20, 2019, and all the benefits accruing therefrom under 35 U.S.C. § 119, the contents of which in its entirety are herein incorporated by reference.

TECHNICAL FIELD OF INVENTION

The invention relates to a fire suppression system, a sprinkler device, a sprinkler bulb comprising a passive circuit device, and a method of testing integrity of a sprinkler bulb.

BACKGROUND OF THE INVENTION

Fire suppression systems typically include sprinkler devices arranged to expel fluid for suppressing or preventing fire. Sprinkler devices typically include bulbs which are arranged to break at predetermined temperatures and thereby cause the sprinkler to emit the fire suppression fluid. In order to function correctly, the bulb of the sprinkler device must break under prearranged circumstances which occur in the event of a fire. The bulb is therefore a critical component of a sprinkler device.

Modern fire suppression systems may be configured to monitor sprinklers e.g. to ensure they are in working order, to track their position for determining the location of a fire etc. Sprinkler devices may therefore be provided with suitable sensors and circuitry installed. However, the operation of sprinkler bulbs is still mechanical and inspection of sprinkler bulbs in the field is still a manual task, and typically requires that the bulb be inspected by eye for damage or other flaws. Given the importance of the bulb, improvements to bulb monitoring process are desirable.

SUMMARY OF THE INVENTION

According to a first aspect of the invention there is provided a sprinkler device, comprising: a sprinkler bulb comprising a sealed frangible housing, and a passive circuit device within the housing, wherein the passive circuit device comprises a wireless module; and a base station configured to detect pressure changes inside the sprinkler bulb via the wireless module.

The sprinkler device may be used for sprinkler bulb crack detection. The sprinkler bulb may be suitable for use in a conventional sprinkler device and/or fire suppression system or the like. The sprinkler bulb may be arranged so that the housing cracks or otherwise breaks under predetermined conditions, for example predetermined conditions indicative of a fire event, so that the sprinkler bulb may be used for activating the sprinkler device and/or a fire suppression system when the predetermined conditions are met. The sprinkler bulb may be arranged to prevent release of a fire suppressant of the like from the sprinkler device unless it breaks. For example, the sprinkler bulb may be configured to shatter when its temperature reaches a predetermined threshold. The sprinkler bulb may be arranged so that when it is intact it may support a predetermined mechanical load, e.g. for holding a seal or plug of a sprinkler device in place to prevent release of fire suppressant.

The sealed frangible housing may contain fluid and may contain liquid and/or gas. The fluid may therefore be sealed within the housing and the housing may be hermetically sealed. The housing may be configured to break when the pressure of the liquid reaches a predetermined threshold. Since liquid pressure and temperature are related, the housing may be configured to break when the liquid reaches a predetermined temperature. The housing and liquid and/or gas may be arranged so that the housing will break under predetermined conditions and the sprinkler bulb will cease to be able to support a mechanical load for preventing release of fire suppressant from the sprinkler device. The housing may be formed of any suitable material, and may be formed of quartzoid.

The passive circuit device may be passive in the sense that it is not able to operate in isolation. It may comprise only passive electronic components. The passive circuit device may itself be incapable of controlling current flow therein. The passive circuit device may be configured only to operate in response to external signals and controls e.g. from the base station or other device external to the sprinkler bulb.

The passive circuit device may be disposed within the fluid in the housing, and may be freely disposed within the fluid and may not be attached or otherwise mechanically coupled to the housing. The circuit device may not interfere with or otherwise affect the function of the sprinkler bulb in breaking under predetermined conditions.

The sprinkler device may be arranged so that upon mechanical failure of the sprinkler bulb a fire suppressant fluid is released for suppression of a fire. In this regard the sprinkler device may be arranged in a conventional manner and may be e.g. installed in a building or other structure where fire suppression capability may be needed. The base station may be installed in a building or the like.

The wireless module may comprise an inductor and a capacitor having a capacitance sensitive to pressure changes within the housing of the sprinkler bulb. The base station may be configured to monitor changes in a resonant frequency of the wireless module caused by changes in the capacitance of the capacitor to thereby detect pressure changes inside the housing of the sprinkler bulb.

The wireless module may be provided by only the capacitor and the inductor.

The inductor and capacitor may be arranged as a resonant circuit, an LC circuit, a tank circuit, a tuned circuit, or the like. The wireless module may therefore have a resonant frequency determined by the characteristics of the inductor and the capacitor. The resonant frequency may be determined the inductance of the inductor and the capacitance of the capacitor. However, pressure changes within the housing may affect the structure and dimensions of the capacitor and may thereby cause its capacitance to change. That is, the capacitor may deform under pressure and that deformation may affect its capacitance e.g. by reducing spacing between its conductive elements. Therefore changes in the capacitance of the capacitor may be indicative of pressure changes within the housing e.g. of the liquid contained in the housing. Moreover, a change in the capacitance of the capacitor will cause a change in the resonant frequency of the wireless module. The change in resonant frequency may be proportional to pressure changes in the sprinkler bulb. The base station may therefore be configured to monitor and/or track changes in the resonant frequency of the wireless module and thereby detect changes in pressure within the sprinkler bulb. Thus, the capacitor and/or wireless module may be arranged in the sprinkler device for use as a pressure sensor.

Therefore, during use, pressure changes within the housing of the sprinkler bulb will cause changes in the capacitance of the capacitor, which in turn will cause changes in the resonant frequency of the wireless unit. The base station will detect and monitor those changes in the resonant frequency and correlate those changes with pressure changes within the housing of the sprinkler bulb. The base station may therefore measure pressure within the sprinkler bulb.

The base station may comprise a resonance tracking module configured to track changes in the resonant frequency of the wireless module. The passive circuit device therefore does not need to be a digital device and does not need to comprise a controller, a microprocessor, or the like. The passive circuit may not need to use RFID technology or the like, since nothing within the passive circuit device needs to store information. The base station may comprise an antenna or the like configured for communication with the passive circuit device in the sprinkler bulb. The antenna may send signals to the wireless module of the passive circuit device and/or may receive signals from the wireless module of the passive circuit device. The wireless module may be configured to react to signals from the antenna of the base station and the base station may be configured to detect that reaction.

The capacitor may be any suitable capacitor capable of changing its capacitance in response to changes in ambient pressure. The capacitor may comprise a plurality of conductive layers separated by a predetermined distance, and the capacitor may be arranged to deform under pressure so that the predetermined distance changes. The capacitor may be a standard capacitor, and fundamentally may comprise at least two electrodes held spatially separated from one another. Changes in the predetermined distance between the layers of the capacitor will result in changes of its capacitance. The predetermined distance between layers of the capacitor may be reduced with increasing pressure, and/or may be increased with reducing pressure. The conductive layers may have any topography and may be substantially planar and the predetermined distance between adjacent layers may be substantially constant e.g. at ambient or atmospheric pressure. That is, the conductive layers may be substantially parallel to one another.

The capacitor may take any form so long as its capacitance detectably changes with pressure. The capacitor may be a simple, plain, or common capacitor. That is, the capacitor may not be specifically adapted for use as anything other than a simple capacitor. The capacitor may be suitable for use in a resonant circuit and may not be specifically adapted for use as a pressure sensor. The capacitor may be manufactured and intended for use only as a capacitor. The capacitor may not have a fluid chamber, a diaphragm, or any other cavity or hollow volume for containing fluid. Therefore, the circuit device may be arranged to detect pressure changes within the housing without the need for specially adapted pressure sensing components. Alternatively, the capacitor may be specially designed for use inside a sprinkler bulb and for use with the devices and methods described herein. The inductor may be any suitable inductor for use in a resonant circuit inside a sprinkler bulb.

The base station may be arranged to wirelessly provide power to the passive circuit device via the wireless module. The passive circuit device may be arranged such that all power used thereby is received via the wireless module. The passive circuit device may not comprise a battery or other power storage device (e.g. other than the capacitor), and may not be capable of powering itself in the absence of external input.

The passive circuit device may comprise a heating element for heating fluid within the housing of the sprinkler bulb. The heating element may be operable to heat fluid within the housing of the sprinkler bulb to thereby increase pressure within the housing. Such increases in pressure may cause the capacitance of the capacitor to change, thereby also changing the resonant frequency of the wireless module. The sprinkler device may therefore be used to test the sprinkler bulb integrity e.g. by using a method described herein.

The passive circuit device may be arranged so that the heating element is activated only upon fulfilment of predetermined conditions e.g. only if a signal received by the wireless module has an amplitude greater than a predetermined threshold. The sprinkler device may therefore be arranged so that the heating element can be activated only when needed by sending a signal to the wireless module having a large enough amplitude. The passive circuit device may be configured so that the heating element is not activated if the signal received by the wireless module has an amplitude less than the predetermined threshold. The sprinkler device may therefore be arranged with an architecture for isolating the resonant circuit spectral parameters from undesirable influence by the heating element load by using circuitry arranged to dynamically connect the heating element depending on signal amplitude using only passive electronic components. The base station may therefore be able to detect that a sprinkler bulb is present, e.g. by eliciting a reaction from the wireless module, without the need to active the heating element.

For example, the passive circuit device may comprise a pair of Zener diodes arranged so that the heating element is activated if the wireless module receives a signal with an amplitude greater than the predetermined threshold. The Zener diodes may be arranged as a voltage switch, and may be disposed in series in opposite orientations. Alternatively, the passive circuit device may comprise a DIAC (diode for alternating current) or other suitable component for activating the heating element upon demand.

The sprinkler device may comprise a device controller configured to test integrity of the sprinkler bulb e.g. by checking for cracks etc. in the housing that would prevent pressure therein reaching a level sufficient to cause the housing to break and thereby activate the sprinkler device. The device controller may be part of the base station and/or another part of the sprinkler device and may be remote from base station. The device controller may not be part of the sprinkler bulb. To test the integrity of the sprinkler bulb, the device controller may send a signal from the base station to the passive circuit device. The passive circuit device may activate the heating element in response to that signal (e.g. if the signal has a sufficiently large amplitude) and thereby cause pressure within the housing of the sprinkler bulb to increase. The device controller may track resulting changes in the resonant frequency of the wireless module of the passive circuit device. The controller may then correlate a frequency change with a change in pressure, or may correlate a given resonant frequency with a given pressure inside the sprinkler bulb. If the pressure in the sprinkler bulb reaches a predetermined threshold (e.g. slightly less than is needed to break the sprinkler bulb) the device controller may determine that the sprinkler bulb is capable of reaching the pressure needed to break in the event of a fire and hence that the sprinkler bulb is in working order and free of cracks or other flaws that might prevent it actuating in the event of a fire. However, if the pressure does not reach a predetermined threshold, that may be indicative of a flaw in the housing—e.g. a crack or micro crack—preventing the pressure reaching a level necessary for the sprinkler bulb to operate. In that case, the device controller may determine that the sprinkler bulb is not in working order. The sprinkler bulb may therefore be replaced to maintain safety.

The device controller may be configured to regularly test the integrity of the sprinkler bulb, and/or may test the integrity upon command e.g. by a user or another controller such as a fire suppression system controller.

The sprinkler bulb may have a diameter of less than about 4 millimetres. The sprinkler bulb may have a conventional size and may be any size suitable for a fire suppression system. However, the sprinkler bulb may be relatively small. The sprinkler bulb may have a size according to e.g. the Day-Impex Range of Standard Glass Bulbs, and may be a 941, 942, or 989 bulb type. Known circuit devices may not be suitable for use in a sprinkler bulb, particularly in a small sprinkler bulb. For example, they may be too large or not suitably shaped, or may not be sufficiently reliable, sensitive to pressure changes over a sufficient range, and/or may be prohibitively expensive for use in a single use item such as sprinkler bulb.

In the sprinkler bulb described herein, the passive circuit device only requires passive components and hence does not need a controller, a microprocessor, a memory, RFID components, or other digital components. The passive circuit device may therefore be small enough to be housed within any sprinkler bulb, including the smallest bulbs, while at the same time being sufficiently reliable, sensitive to pressure changes over a sufficient range, and relatively cheap.

Pressure changes within the sprinkler bulb may be expected to range during use between approximately 0 to 2.5 MPa (0 to 25 bar). The capacitance of the capacitor may vary measurably with the pressure over this range. Therefore the capacitor may be sensitive to pressure changes within the working pressure ranges of the sprinkler bulb.

According to a second aspect of the invention there is provided a fire suppression system comprising a plurality of sprinkler devices as described herein with reference to the first aspect of the invention, and a system controller configured to simultaneously test integrity of a plurality of the sprinkler bulbs of the plurality of sprinkler devices. The system controller may control the sprinkler devices via their respective device controllers (if present), or may control the sprinkler devices directly. Since each sprinkler device is capable of testing the integrity of its own sprinkler bulb, the fire suppression system may simultaneously test the integrity of multiple or even all constituent sprinkler bulbs. The fire suppression system may be configured to regularly and frequently test integrity of constituent sprinkler bulbs e.g. upon start-up of the system, and/or each day and so on.

According to a third aspect of the invention there is provided a sprinkler bulb comprising a sealed frangible housing, and a passive circuit device within the housing, wherein the passive circuit device comprises a capacitor and an inductor arranged as a resonant circuit. The capacitor of the resonant circuit may be arranged to have a capacitance sensitive to ambient pressure changes e.g. in a range from about 0 bar (0 MPa) to 25 bar (2.5 MPa). The passive circuit device may comprise a heating element. The passive circuit device may be arranged so that the heating element will activate only upon receipt by the resonant circuit of a signal having an amplitude greater than a predetermined threshold. The circuit device may be arranged not to activate the heating element upon receipt by the resonant circuit of a signal having an amplitude less than the predetermined threshold. The passive circuit device may comprise a pair of Zener diodes arranged as a voltage switch for activating the heating element. The sprinkler bulb may be a convention size and may have a diameter of less than about 4 millimetres. The sprinkler bulb may be a sprinkler bulb as described herein with reference to the first aspect of the invention and/or the second aspect of the invention, and may comprise any of the features described herein with reference to such sprinkler bulbs.

According to a fourth aspect of the invention there is provided a method of testing integrity of a sprinkler bulb, comprising: monitoring a pressure change within the sprinkler bulb via a wireless module of a passive circuit device inside a sealed frangible housing of the sprinkler bulb; and determining that the sprinkler bulb is in working order if the pressure reaches a predetermined threshold; or determining that the sprinkler bulb is not in working order if the pressure does not reach the predetermined threshold.

The pressure change may be a pressure increase and may be caused by an increase in a temperature of a fluid in the housing of the sprinkler bulb. The method may comprise monitoring the pressure change within a predetermined time period. For example, the method may comprise determining that the sprinkler bulb is not in working order if the pressure does not reach the predetermined threshold within a predetermined time period. Other conditions may need to be satisfied for the sprinkler bulb to be determined to be in working order. For example, the pressure may need to increase by a predetermined amount upon being heated for a predetermined time. Different tests may be suitable for different bulbs and/or systems.

Monitoring the pressure change within the sprinkler bulb may comprise monitoring a change in a resonant frequency of the wireless module caused by a change in a capacitance of a capacitor of the wireless module, and determining the pressure change based upon the change in the resonant frequency. The method may comprise associating a change in the resonant frequency of the wireless module with a change in pressure within the housing of the sprinkler bulb. The method may comprise correlating the change in the resonant frequency with the change in pressure. The change in the capacitance of the capacitor may be caused by a change in pressure within the housing of the sprinkler bulb. The method may therefore comprise determining the integrity of the sprinkler bulb based upon whether or not a resonant frequency of the wireless module changes by more than a predetermined amount.

The method may comprise measuring pressure within the sprinkler bulb based upon the resonant frequency. The method may comprise correlating resonant frequencies of the wireless module with pressures inside the sprinkler bulb.

The method may comprise wirelessly supplying power to the passive circuit device sealed inside the housing of the sprinkler bulb using a base station. The method may comprise emitting from the base station a signal to induce a response from the passive circuit device and detecting that response using the base station. The power may be supplied to the passive circuit device via the wireless module.

The method may comprise heating a fluid within the housing of the sprinkler bulb to increase pressure therein and thereby simulate a fire event. The method may comprise using the power wirelessly supplied by the base station to heat the fluid within the housing. The method may comprise activating a heating unit to heat the fluid.

The method may comprise activating a heating element of the passive circuit device by sending a signal to the wireless module having an amplitude greater than a predetermined threshold. The method may include activating the heating element only if the wireless module receives the signal having an amplitude greater than a predetermined threshold.

The method may comprise not activating the heating element if a signal received by the wireless module has an amplitude less than the predetermined threshold.

The method may comprise using a sprinkler device as recited herein with reference to the first aspect of the invention, or using fire suppression system as recited herein with reference to the second aspect of the invention, or using a sprinkler bulb as recited herein with reference to the third aspect of the invention. The method may therefore include features described with reference to any aspect of the invention. The fire suppression system and/or sprinkler device may comprise a controller configured to carry out the method according to the fourth aspect of the invention.

According to another aspect of the invention there is provided a method of monitoring pressure within a sealed housing using a passive circuit device inside the housing. According to another aspect of the invention there is provided a system configured to measure pressure within a sealed housing by detecting using an external module a change in a resonant frequency of a wireless unit inside the housing.

BRIEF DESCRIPTION OF THE DRAWINGS

Certain embodiments of the invention are described below by way of example only and with reference to the figures in which.

DETAILED DESCRIPTION OF THE INVENTION

Figure 1:
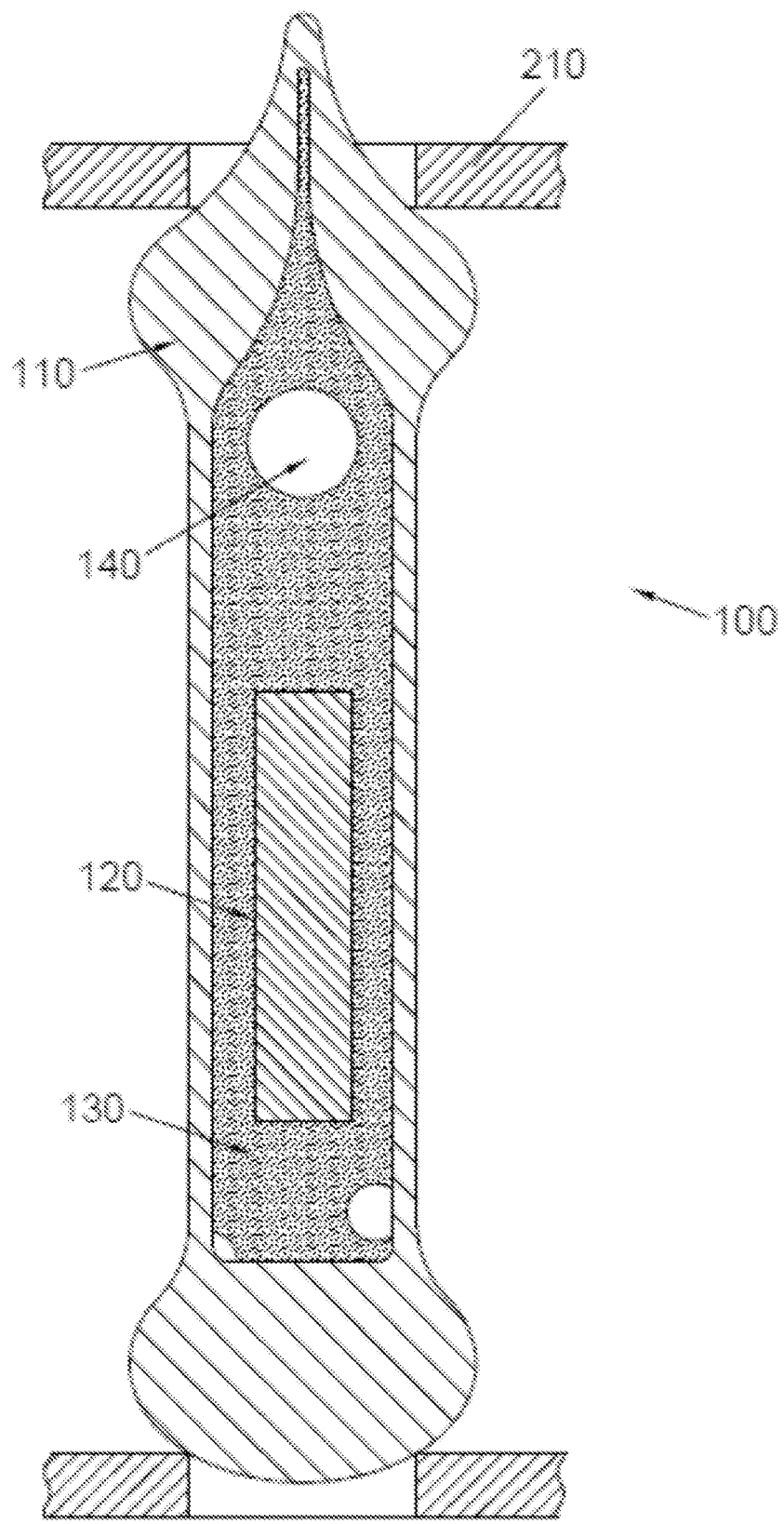
FIG. 1 shows a sprinkler bulb comprising a housing and a passive circuit device inside the housing.

FIG. 1 shows a sprinkler bulb 100 comprising a sealed frangible housing 110 and a passive circuit device 120 disposed within the housing 110. The passive circuit device 120 is therefore sealed inside the housing 110. The housing 110 also contains a liquid 130 and a gas bubble 140.

In use, the bulb 100 is located in a sprinkler device (partially shown in FIG. 1), and is positioned to hold a seal, plug or the like in place to prevent fire suppression fluid from leaving the sprinkler device. The sprinkler device comprises a base station 200 (shown schematically in FIG. 2). The seal 210 of the sprinkler device is shown in FIG. 1. The sprinkler bulb 100 is arranged so that it prevents deployment of fire suppressant fluid unless it breaks. In the event of a fire near the sprinkler device, the liquid 130 in the housing 110 will be heated and therefore pressure within the housing 110 will increase. Once the liquid 130 reaches a predetermined temperature (e.g. indicative of being near a fire), the resulting pressure from the heated liquid 130 will break the frangible housing 110 and the seal 210 of the sprinkler device will no longer be held in place. Fire suppression fluid will then be discharged from the sprinkler device. The housing 110, liquid 130, and gas bubble 140 can be configured so that the housing 110 will break under predetermined conditions e.g. when the liquid 130 reaches a predetermined temperature, and hence when the housing 110 is exposed to a predetermined pressure thereby. The housing 110 may be formed of any suitable material, and may be formed of quartzoid.

If the housing 110 of the bulb 100 is damaged, for example by a crack, pressure increases in the liquid 130 inside the housing 110 may be able to normalise with ambient pressure outside the housing 110. For example, liquid 130 may leak out of the housing 110 and/or gas may leak into the housing 110. In that case, pressure within the housing 130 may not reach the level needed to cause the housing 110 to break, and therefore the sprinkler device may not be able to discharge fire suppressing fluid in the event of a fire. Thus, damage to or cracks in the housing 110 can jeopardize operational safety of the sprinkler device. Even micro-cracks—which may not be visible to an unaided human eye—can prevent proper functioning of the sprinkler blub 100.

Therefore, known methods of detecting cracks in sprinkler bulbs installed in sprinkler devices in the field—which methods typically involve inspection of the bulbs by eye—may not be sufficient to ensure that a sprinkler device is in working order, and hence may not ensure operational safety of a fire suppression system. Further, such methods are time intensive. Methods which do not involve inspecting bulbs by eye are also known, but are unsuitable for use outside laboratory or factory conditions and with bulbs installed on site, and are typically unsuitable for testing bulbs en mass. Given that sprinkler devices are safety-critical, improvements in regard to testing are desirable.

To address the above matters, the sprinkler bulb 100 of FIG. 1 comprises a passive circuit device 120 sealed within the housing 110. The passive circuit device 120 comprises a wireless module 160 such as an LC circuit, comprising a capacitor 150 and an inductor 170. The sprinkler device also comprises a base station 200 arranged to wirelessly supply power to the passive circuit device 120 and monitor changes in a resonant frequency of the wireless module 160. The passive circuit device also comprises a heating element 180 and a pair of Zener diodes 190 arranged as a voltage dependent switch for controlling operation of the heating element 180.

The resonant frequency of the wireless module 160 is determined by properties of the inductor 170 and capacitor 150. The circuit device 120 therefore is responsive to signals over a certain bandwidth from the antenna 230 of the base station 200.

The passive circuit device 120 is disposed within the housing 110. It is necessary for proper operation of the sprinkler bulb 100 that the housing 110 is sealed to prevent any and all leaks (e.g. to prevent ingress of any fluid into the housing 110, and/or prevent egress of any fluid out of the housing 110) otherwise the housing 110 may not break in the event of an emergency, as described above. The passive circuit device 120 is therefore sealed within the housing 110 and cannot simply be provided with external connections e.g. for power and/or communication.

Figure 2:
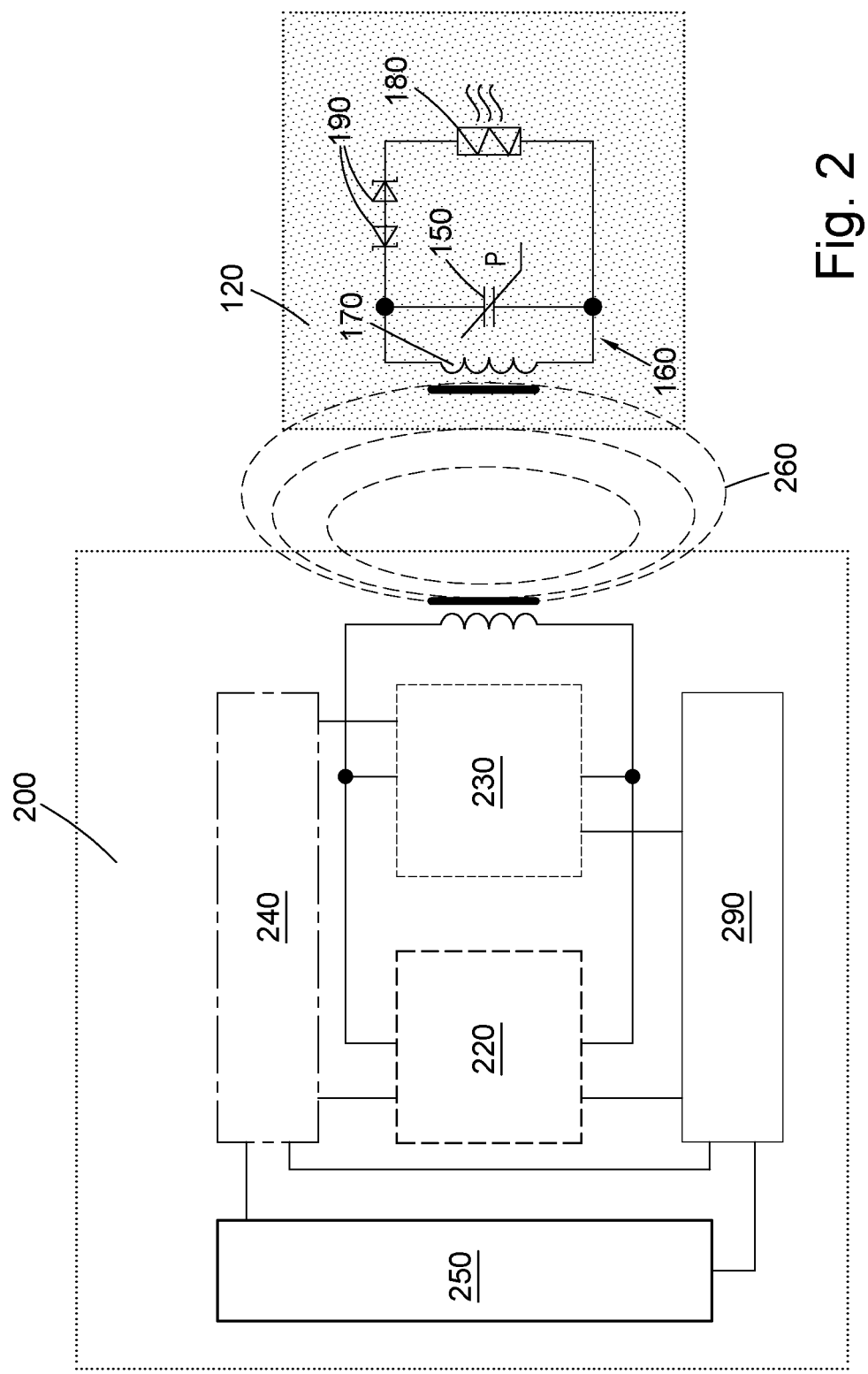
FIG. 2 shows a schematic diagram of communication between the passive circuit device of the sprinkler bulb of FIG. 1 and a base station.

FIG. 2 shows a schematic of the base station 200 provided proximate the passive circuit device 120 to control, communicate with, and power the passive circuit device 120. The base station 200 comprises a resonance tracking unit 220 for detecting and tracking changes in a resonant frequency of the wireless module 160. It also comprises an antenna 230 for emitting to, and receiving signal from, the wireless module 160. A power supply 240 is provided to power to the base station 200, and also to power the passive circuit device 120 via interaction of the antenna 230 and wireless module 160. A communication and integration module 250 is provided to communicate with and integrate into a system architecture comprising e.g. a system controller and other sprinkler devices. A device controller 290 is provided to control operation of the base station 200 and passive circuit device 120. Communication between the base station 200 and the passive circuit device 120 is shown schematically by the lines of magnetic flux 260. The device controller 290 may control operation of the sprinkler device autonomously, or may control operation of the sprinkler device under the control of a remote system controller arranged to control e.g. a plurality of sprinkler devices and sprinkler bulbs.

Using the arrangement of FIG. 2, the housing 110 of the bulb 100 may be tested for cracks using the passive circuit device 120. The device controller 290 is configured to control operation of the passive circuit device 120 in order to carry out such a test. During a test, the device controller 290 instructs the antenna 230 to emit a signal which is received by the wireless module 160. The signal has an amplitude greater than a predetermined threshold and large enough to active the voltage switch provided by the two Zener diodes 190. The heating element 180 is therefore activated and the liquid 130 within the housing 110 is heated so that pressure inside the sprinkler bulb increases. The resulting pressure increase in the liquid 130 causes the capacitor 150 to deform and hence changes its capacitance.

Figure 3:
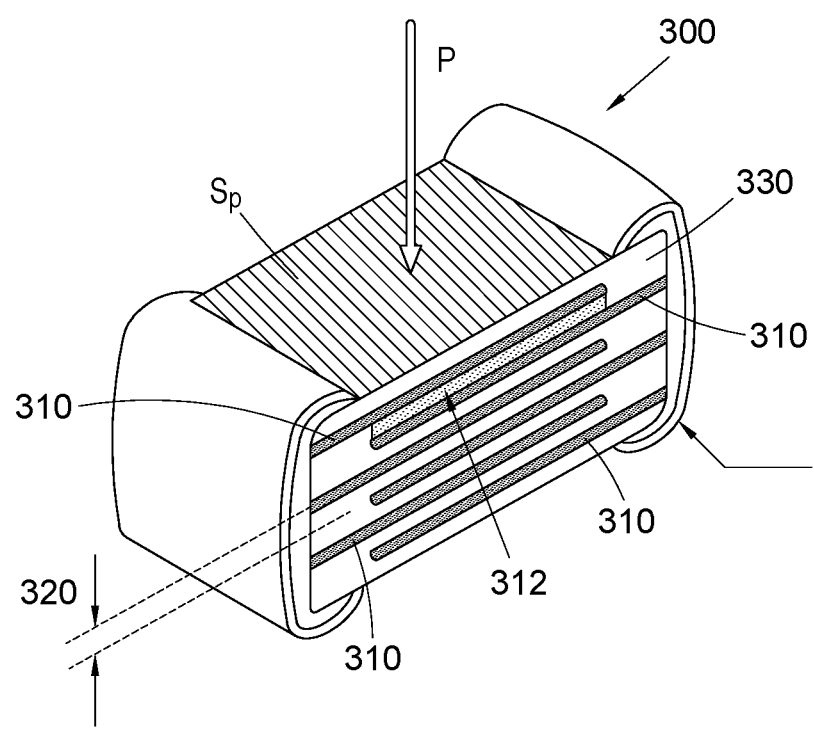
FIG. 3 shows a perspective view of a capacitor for use as a pressure sensor in the passive circuit device of FIG. 2.

FIG. 3 shows an example of a standard capacitor 300 for use as the capacitor 150 of the wireless module 160 of the passive circuit device 120. The capacitor 300 comprises a plurality of conductive sheets 310 (i.e. electrodes) separated by a predetermined distance 320 using a dielectric material 330. An active area 312 of the capacitor is defined by an overlap of the conductive sheets 310. If the capacitor 300 is subjected to a change in pressure (shown schematically by the arrow P) it will deform and the predetermined distance 320 between the conductive sheets 310 will change, thereby changing the capacitance of the capacitor 300. The greater the change in the predetermined distance 320, the greater the change in the capacitance.

The capacitance of a capacitor may be expressed as:

$$C = \varepsilon \cdot (n \cdot A)/d$$

where $\varepsilon$ is the dielectric permittivity, n is the number of conductive sheets 310 of the capacitor, A is the active area of one of the sheets 310, and d is the predetermined distance 320 between the sheets 310.

From the above expression, it can be seen that as d decreases with increasing pressure, the capacitance of the capacitor 300 will increase (since the other factors do not change for a given capacitor 300). The distance d (i.e. the predetermined distance 320) as function of pressure p may be expressed as:

$$d(p) = d\_0(1 - p/E)$$

where E is Young's modulus of the capacitor in a direction normal to the active area, p is the hydrostatic pressure, and d0 is the original predetermined distance 320 between the conductive sheets 310 of the capacitor 300. Therefore, from the above expressions the pressure within the housing 110 of the sprinkler bulb is known as a function of capacitance capacitor 150.

The resonant frequency of the LC circuit 160 is a two-variable function of the inductance of the inductor 170 and of the capacitance of the capacitor 150. However, the inductance of the inductor 170 is substantially insensitive to changes in ambient pressure. As the pressure in the sprinkler bulb 100 increases and the capacitance of the capacitor 150 changes, the resonant frequency of the LC circuit 160 will change correspondingly. The greater the change in pressure, the greater the change in the capacitance and resulting change in the resonant frequency of the wireless module 160.

Therefore, by being arranged to monitor the resonant frequency of the wireless module 160, the base station 200 is thereby able to monitor the pressure of the liquid 130 within the housing 110. The base station 200 measures the resonant frequency using the resonance tracking unit 220 and the device controller 290 correlates the resonant frequency with a pressure inside the sprinkler bulb. The device controller 290 therefore determines pressure in the sprinkler bulb via the wireless module 160.

Figure 4B:
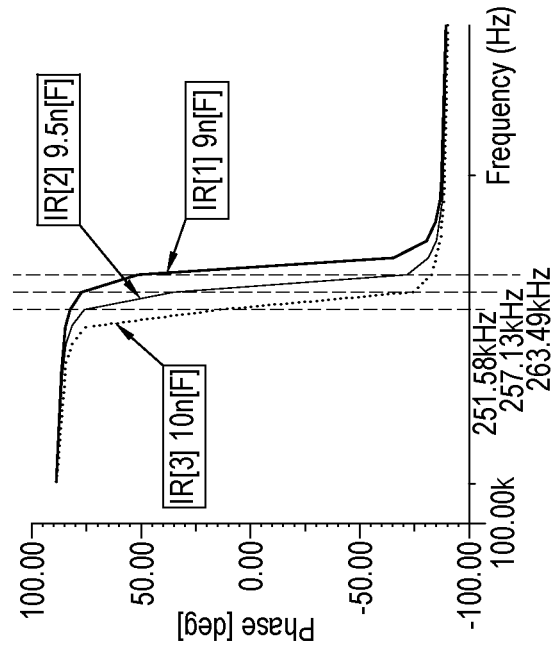
FIGS. 4A and 4B shows changes in resonant frequency of a wireless module of the passive circuit device as pressure inside the sprinkler bulb changes.
Figure 4A:
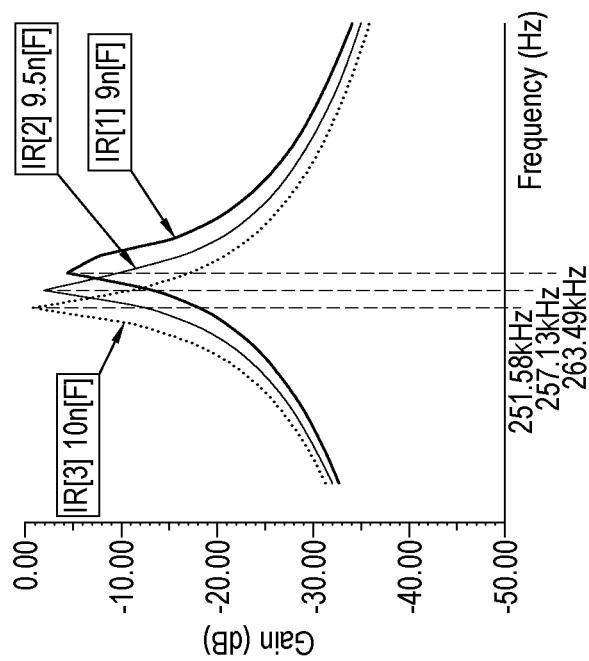

FIGS. 4A and 4B show examples of how the resonant frequency of the LC circuit changes with pressure. In FIG. 4A, the three curves show the frequency as a function of gain. Therein, the resonant frequency shifts from 263.49 kHz, through 257.13 kHz, to 251.58 kHz as pressure (and the capacitance of the capacitor) increases. FIG. 4B shows frequency against phase for the same situation, and the change in the resonant frequency is shown to be the same as for FIG. 4A.

The sprinkler device may therefore measure pressure and/or monitor pressure changes within the housing of the sprinkler bulb where the wireless module is located. The sprinkler device is then also able to test integrity of the sprinkler bulb using the heating element 180.

If during heating, pressure within the housing 110 reaches a predetermined level (e.g. a pressure nearly sufficient to break the housing 110) after the liquid 130 has been heated for a time, the device controller 290 may then determine that there is no pressure loss and therefore that there are no cracks in the housing 110. Thus, the bulb 100 may be determined to be in working order. Alternatively, if the pressure within the housing 110 does not reach the predetermined level after the liquid 130 has been heated for a time, the device controller 290 may determine that there is a pressure loss and hence a crack or the like in the housing. The blub 100 may then be determined not to be in working order.

Figure 5:
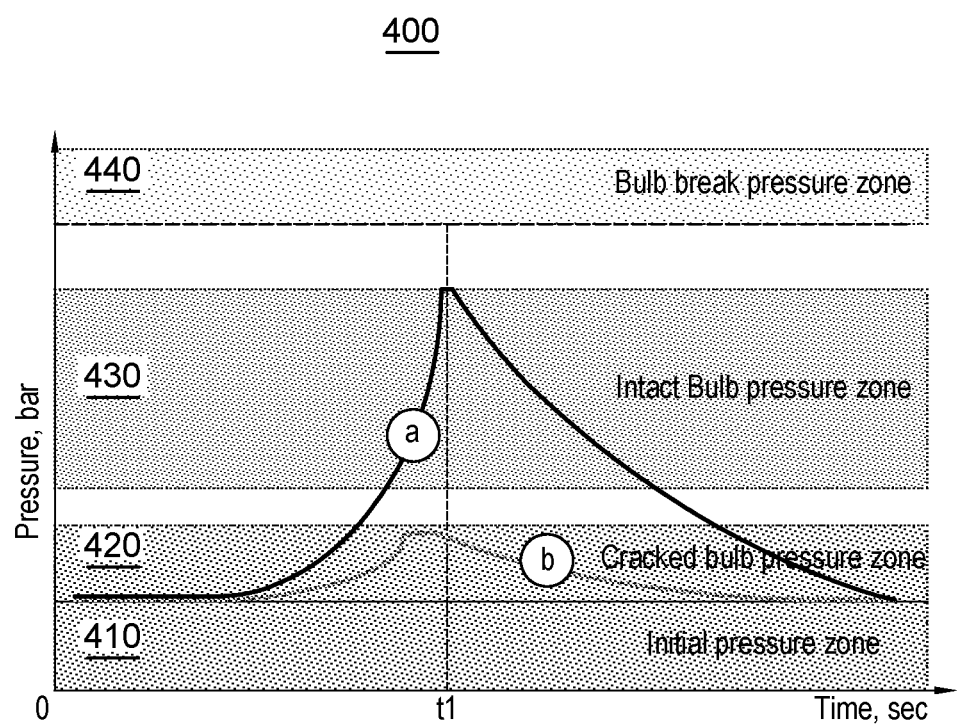
FIG. 5 shows a schematic indicating characteristic pressure regions of the sprinkler bulb during heating.

FIG. 5 shows an example of various diagnostic ranges during a process for detecting a cracked sprinkler bulb. Different ranges, zones, and values may be used for different configurations of a particular sprinkler bulb. For example, the curves a and b of FIG. 5 are a function of the volume of liquid and gas in the housing 110, the type of liquid and gas, the type of material used for the frangible housing 110 etc.

FIG. 5 shows pressure changes in the housing 110 measured by device controller 290 during testing of the sprinkler bulb 100 and heating of the liquid 130. The horizontal axis indicates the time after the heating element 180 is activated, and the vertical axis indicates the pressure that is measured at a particular time. In a sprinkler bulb 100 that is in working order, the heating element 180 is expected to raise the temperature of the liquid 130, and hence increase the pressure in the housing 110, by a certain amount within a predetermined time period t1. The point t1 can therefore be used as a reference point to test the integrity of the bulb 100.

During testing, the pressure starts in an initial pressure zone 410, indicative of a pressure range at which the bulb 100 is ready for use e.g. prior to heating or a fire event. The pressure of the bulb 100 would be expected to be in this range if intact and when not heated. If the bulb 100 is in working order (i.e. not damaged) the pressure will increase approximately along curve a. That is, the pressure increases with increasing time (i.e. increasing temperature) while heated. Heating of the liquid 130 is stopped at time t1, and the pressure in the housing then falls again as the liquid 130 cools. The pressure therefore does not reach zone 440, wherein the housing 110 of the sprinkler bulb 100 is expected to break e.g. as would be the case in a fire event. However, curve a shows that the pressure does enter zone 430 in which the pressure of the liquid 130 increases with time and reaches a relatively high level. Zone 430 is therefore indicative of an intact bulb 100, and hence a bulb 100 which is in working order. The predetermined threshold for determining that the sprinkler bulb 100 is in working order, may be at a level in zone 430 e.g. near its upper range.

If the bulb 100 is not in working order (e.g. it is cracked) the pressure will increase approximately along curve b. On curve b, the pressure starts to increase with heating but soon plateaus. It is therefore evident that the pressure in the housing 110 will not reach zone 440, or even zone 430, and will not be sufficient to cause the housing 110 to shatter, despite the continued application of heat to the liquid 130 of the sprinkler bulb 100. Therefore, the sprinkler bulb 100 is not safe to use because it will be unlikely to break in the event of a fire.

The passive circuit device 120 is clearly a safety-critical component and should therefore be highly reliable. It is also preferable that the capacitor 150 be sensitive to pressure changes over a relatively wide pressure range e.g. from about 0 bar (i.e. 0 Pa) to about 25 bar (i.e. 2.5 MPa). Further, sprinkler devices are typically a conventional size, and sprinkler bulbs therefore have a conventional size which is relatively small, so the passive circuit device should be sufficiently small and correctly shaped to be housed within a conventional sprinkler bulb. Finally, sprinkler bulbs are single use items so the cost of the passive circuit device should not be prohibitive.

The sprinkler device described herein addresses the above requirements by use of the passive circuit device which does not require complicated electronics or expensive components. It therefore does not need a micro-processor, controller, memory or the like. It does not rely on RFID technology or the like and does not require digital communication. It may therefore be made simply and cheaply. It may also be reliable because of its simplicity. It may also be made small enough to fit within all conventional sprinkler bulbs because it requires so few components.

Thus, according to the disclosure herein, autonomous, reliable and remote testing of sprinkler bulbs 100 may be accomplished, and may be performed en mass. Bulbs 100 may be checked regularly by a central system and faulty bulbs 100 may be flagged for replacement. The disclosure herein provides a simple and reliable mechanism for measuring pressure within a sprinkler bulb by recognising that the resonant frequency of a wireless module in the bulb may change with pressure.

What is claimed is:

1. A sprinkler device, comprising:
   a sprinkler bulb (100) comprising a sealed frangible housing (110), and a passive circuit device (120) within the housing (110), wherein the passive circuit device (120) comprises a wireless module (160); and
   a base station (200) configured to detect pressure changes inside the sprinkler bulb (110) via the wireless module (160);
   wherein the wireless module (160) comprises an inductor (170) and a capacitor (150) having a capacitance sensitive to pressure changes within the housing (110) of the sprinkler bulb (100), and wherein the base station (200) is configured to monitor changes in a resonant frequency of the wireless module (160) caused by changes in the capacitance of the capacitor (150) to thereby detect pressure changes inside the housing (110) of the sprinkler bulb (100).

2. A sprinkler device as claimed in claim 1, wherein the base station (200) is arranged to wirelessly provide power to the passive circuit device (120) via the wireless module (160).

3. A sprinkler device as claimed in claim 1, wherein the passive circuit device comprises a heating element (180) for heating fluid within the housing (110) of the sprinkler bulb (100).

4. A sprinkler device as claimed in claim 3, wherein the passive circuit device (120) is arranged so that the heating element (180) is activated only if a signal received by the wireless module (160) has an amplitude greater than a predetermined threshold.

5. A sprinkler device as claimed in claim 1, comprising a device controller (290) configured to test integrity of the sprinkler bulb (100).

6. A sprinkler device as claimed in claim 1, wherein the sprinkler bulb (100) has a diameter of less than 4 millimetres.

7. A fire suppression system comprising a plurality of sprinkler devices as claimed in claim 1, and a system controller configured to simultaneously test integrity of a plurality of the sprinkler bulbs (100) of the plurality of sprinkler devices.

8. A sprinkler bulb comprising a sealed frangible housing (110), and a passive circuit device (120) within the housing (110), wherein the passive circuit device (120) comprises a capacitor (150) and an inductor (170) arranged as a resonant circuit.

9. A method of testing integrity of a sprinkler bulb, comprising:
   monitoring a pressure change within the sprinkler bulb (100) via a wireless module (160) of a passive circuit device (120) inside a sealed frangible housing (110) of the sprinkler bulb (100); and
   determining that the sprinkler bulb is in working order if the pressure reaches a predetermined threshold; or
   determining that the sprinkler bulb is not in working order if the pressure does not reach the predetermined threshold;
   wherein monitoring the pressure change within the sprinkler bulb (100) comprises monitoring a change in a resonant frequency of the wireless module (160) caused by a change in a capacitance of a capacitor (150) of the wireless module (160), and determining the pressure change based upon the change in the resonant frequency.

10. A method as claimed in claim 9, comprising wirelessly supplying power to the passive circuit device (120) sealed inside the housing (110) of the sprinkler bulb (100) using a base station (200).

11. A method as claimed in claim 9, comprising heating a fluid within the housing of the sprinkler bulb to increase pressure therein and thereby simulate a fire event.

12. A method as claimed in claim 9, comprising activating a heating element (180) of the passive circuit device (120) by sending a signal to the wireless module (160) having an amplitude greater than a predetermined threshold.

* * * * *